E. V. MYERS.
BRAKE.
APPLICATION FILED APR. 3, 1918.

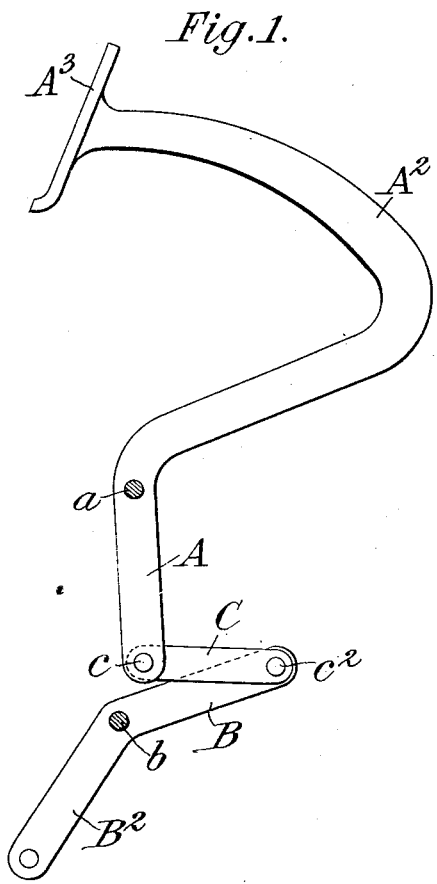
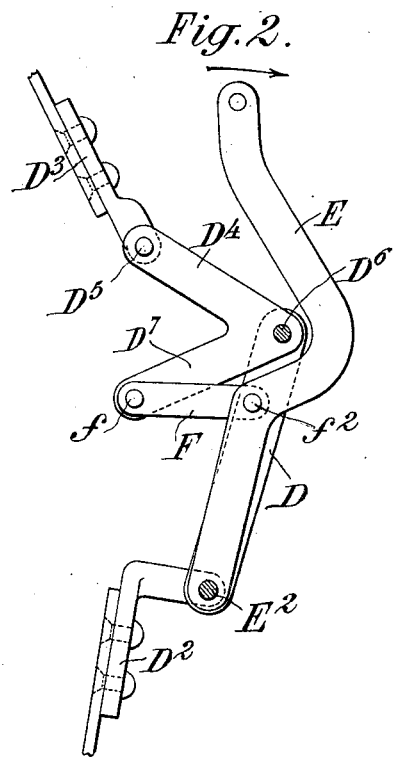
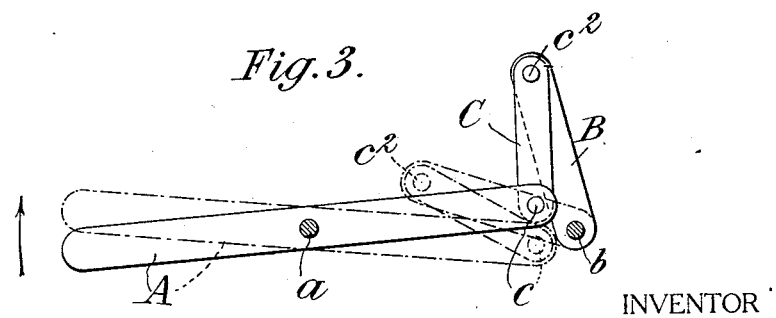

1,410,111.

Patented Mar. 21, 1922.
2 SHEETS—SHEET 2.

WITNESS:
Rene Bruine

INVENTOR
Eugene V. Myers,
By Attorneys,

UNITED STATES PATENT OFFICE.

EUGENE V. MYERS, OF EAST ORANGE, NEW JERSEY.

BRAKE.

1,410,111.   Specification of Letters Patent.   Patented Mar. 21, 1922.

Application filed April 3, 1918. Serial No. 226,367.

*To all whom it may concern:*

Be it known that I, EUGENE V. MYERS, a citizen of the United States of America, residing in East Orange, in the county of Essex and State of New Jersey, have invented certain new and useful Improvements in Brakes, of which the following is a specification.

My invention relates to brakes and is of more especial application to automobiles, although the mechanism may have utility in other relations where a brake operation is present.

In my application filed June 16, 1916, Serial No. 103,941, I have broadly described a construction in which the brake pedal, lever or other operating part, during a complete stroke, gives the brake two kinds of movement, one a quick movement and the other a relatively slow movement. In the specific construction described, the slow movement is in advance of the quick movement, the result being that as the foot pedal, for instance, is operated, the slow movement applies or sets the brakes in the usual manner until the brake band becomes worn to a certain extent, whereupon the last part of the movement of the foot pedal applies the brakes more rapidly, thus permitting a longer use without readjustment. This specific development is especially applicable to small cars wherein the user has an ample surplus of power to effectively apply the brakes at the higher leverage.

The present invention relates to an embodiment which is equally applicable to cars of any weight, since the power required in the actual application of the brakes may be substantially normal throughout the effective braking movement of the pedal. According to the present invention, I tighten the brake band or other equivalent with movements of two speeds, as before, but in the present instance the tightening effect is more rapid during the first part or take-up portion of the stroke of the pedal or other operating member. By this means the normal slack of the brake band or other brake mechanism is taken up quickly: that is to say, by a short movement of the operating member. In brakes as heretofore constructed wherein there has been a substantially constant speed of tightening with a substantially constant movement of the operating member, a large part of the total travel of the operating member has been consumed by the mere taking up of the slack so that only a relatively small portion of the total movement of the operating member could be devoted to the actual application of the brakes. With heavy cars the quick initial take-up movement by the present invention cannot be satisfactorily continued, in many cases, beyond the point where the brake comes in contact with the drum or wheel, since too much power would have to be exerted by the operator to actuate the brakes. According to my invention, when the slack is taken up, the leverage is dropped to a substantially normal brake-setting leverage so that the actual application of the brakes need not differ from those commonly in use.

In automobile and other similar practice, the total movement of the braking pedal or lever is necessarily limited, having ordinarily a throw of about eight inches or less, which is customarily along a fairly flat arc, so that the operating member moves less than 45°. With this limited movement, that portion which has been devoted to the actual application of the brakes is necessarily short, in view of the considerable movement required to take up the slack. As the brake bands wear, frequent adjustments are hence necessary. The present invention permits much greater wear of the bands without the necessity of adjustment. The invention also secures a more rapid application of the brakes than is possible with the present constructions.

According to one method of accomplishment, I employ a pair of independently pivoted levers, one of which is connected to or constitutes the operating member, while the other is connected to the brake device, and I join the levers by a link which is so related to them that when one lever is traveling about its axis at a constant speed, the other will have imparted to it widely varying speeds, occurring at different points in its travel. The two pivoted levers are so related that the distance between their axes is materially less than the sum of the lengths of their link connected arms, and the length of the link is but slightly greater than the difference between said sum and the distance between said axes, said link being cross connected between said arms, so that said levers rotate in opposite directions.

The mechanical advantage of such a mechanism, and the velocity of rotation of the actuated lever, with respect to the actuating lever, vary materially for different relative positions of the parts of the mechanism. The same effect can be had in other ways, as—for instance—by providing the first lever with a cam surface of irregular formation, and positioning it in co-operative relationship with the second lever, and as the cam changes its position a different portion of it comes into effective relation with the second lever, exerting greater leverage upon the latter and at the same time effecting a variation in relative speed.

To these and other ends, the invention consists in certain improvements and combinations of parts, as will be hereinafter more fully set forth and pointed out in the claims at the end of the specification.

In the drawings,—

Figure 1 is a side elevation illustrating the application of one form of the invention to a brake treadle;

Fig. 2 is a side elevation illustrating the application of my improvement in slightly different form, to a brake band;

Fig. 3 is a diagrammatic view, showing in full and broken lines, respectively, the relative positions at the beginning and end of the take-up part of the movement of a mechanism operating according to the principle embodied in the structures of Figs. 1 and 2;

Figure 4:
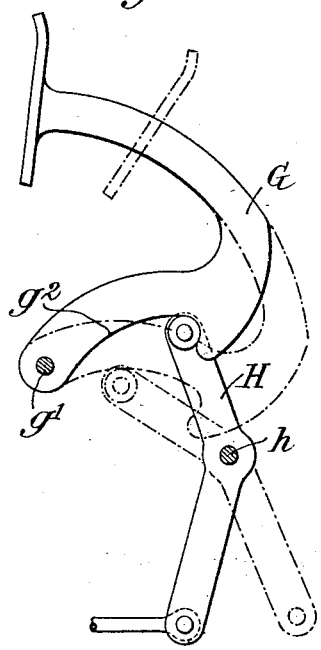
Fig. 4 is a side elevation of a modified arrangement as applied to a brake treadle.

Referring to Fig. 1, A designates the operating member or actuating lever which is pivoted at $a$ and carries an upwardly-extending portion $A^2$ terminating in a foot portion $A^3$ and constituting the usual type of brake treadle. B designates what I will term the actuated lever, consisting of a lever pivotally mounted at $b$ and connected by any suitable rod or other means with the operating lever of the brake band, brake shoe or other brake device, it being understood that the movement of the lever B is substantially the same as the movement of the brake device. To this end it carries an arm $B^2$, from which connection is made to the brake device. A link C connects the adjacent ends of the levers A and B, as shown clearly in Fig. 1, the parts being illustrated in normal position. The pivotal connection of the link C with lever A is designated by $c$, and its connection with lever B is designated by $c^2$.

For a better understanding of the operation of the lever mechanism illustrated in Fig. 1, reference may be had to Fig. 3, where the corresponding parts are similarly designated and the normal position appears in full lines, the broken lines showing the positions of the parts of the mechanism at the end of the take-up movement to remove the slack. As the operating member or lever A is moved in the direction of the arrow on its axis $a$, the lever B or brake device, and the link C, are moved toward the dotted-line position, and this initial travel of the lever B occurs very quickly, owing to the fact that, in the form shown, the pivot point $c$ is relatively near to the pivot $b$, when in normal position, and throughout this initial movement, but, as the pivot $c$ moves away from pivot $b$, during the subsequent brake-setting operation of the mechanism, the movement of the lever B becomes slower. The relation of pivots $b$ and $c$ determines, in part at least, the quickness or slowness of the initial movement of B; to impart a quicker initial movement, the parts are constructed with the lever arm $a$—$c$ more nearly equal to the distance $a$—$b$, so that the pivot $c$ is closer to the pivot $b$, and, to make a slower initial movement, the relative length of the arm $a$—$c$ is reduced, so that the pivot $c$ is displaced further away from $b$. To vary the rate of final movement, the pivot $c^2$ may be adjusted with relation to the pivot $a$, by varying the length of the arm $b$—$c^2$. The nearer $c^2$ is brought to $a$, during the setting movement, the slower will be the final movement. If these two pivots be brought to a point where they are coincident, no movement of B will take place after they reach alinement.

It will be apparent, from Fig. 3, that the distance between the axes $a$, $b$, is less than the sum of the length of the lever arms $a$—$c$ and $b$—$c^2$, and that, when the arms $a$—$c$ and $b$—$c^2$ are parallel with each other, their link connected ends extend in opposite directions, with the link C so disposed as to make an acute angle with each lever arm. This arrangement is preferred, as it has been found to be very effective, although other forms may be utilized for the same purpose.

In applying this principle to a brake band directly, I may utilize a structure such as shown in Fig. 2, in which D is a link connected at one end of the end $D^2$ of the brake band, while $D^3$ designates the opposite end of the brake band which is connected to a brake lever $D^4$. The latter is pivoted to the band at $D^5$, and is in the form of an angle arm pivotally mounted at $D^6$ upon the link D. E designates the operating member or lever pivoted at $E^2$ upon the link D and connected to the lever $D^4$ by a link F which is pivoted to the lever $D^4$ at $f$ and to the lever E at $f^2$. It will be understood that the free end of the operating member or lever E is to be connected to a hand device or treadle, and as it is moved in the direction of the arrow the link F and lever D⁴ are moved similarly to the corresponding parts in the structures already described, so that an initial fast movement of the lever D⁴ and brake band is caused, followed by a final movement which is gradual and slower, as the pivot j² recedes from the pivot D⁶. In this construction the arm D⁷ corresponds to the lever B in Fig. 3.

In Fig. 4, G designates the operating member or treadle pivoted at g' and having a cam surface g². The cam surface g² cooperates with a roller or projection upon the lever H which is pivoted at h and suitably connected to the brake band. It will be observed that as the treadle G is depressed to the position shown in dotted lines, the cam surface g² will cause a rapid initial movement of the lever H, and as the point of engagement with the lever H approaches the pivot g', the speed of movement of the lever H or brake device is materially reduced, the transition being more or less abrupt.

Figure 5:
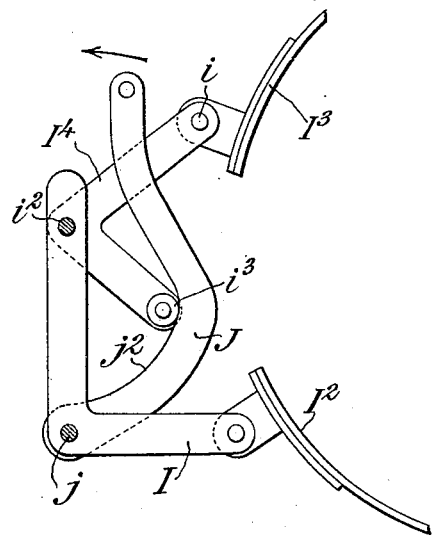
Fig. 5 is a similar view showing the application of the same modification to a brake band.

This same principle is shown in Fig. 5 as applied to a brake band directly. I designates an elbow frame which is connected to one end I² of the brake band. I³ designates the other end of the band and I⁴ is the brake device or lever pivotally connected with the brake band at i. The lever I⁴, which is in the form of an angle arm, is pivoted on the stationary support at i² and carries a roller or projection i³. J designates the operating member or lever pivoted at j and having the cam surface j² engaging the roller or projection i³. The operating lever J will be connected with a hand device or treadle, and when moved in the direction of the arrow from its normal position, will produce an initial quick movement of the lever I⁴, followed by a slow application of the brake.

Figure 6:
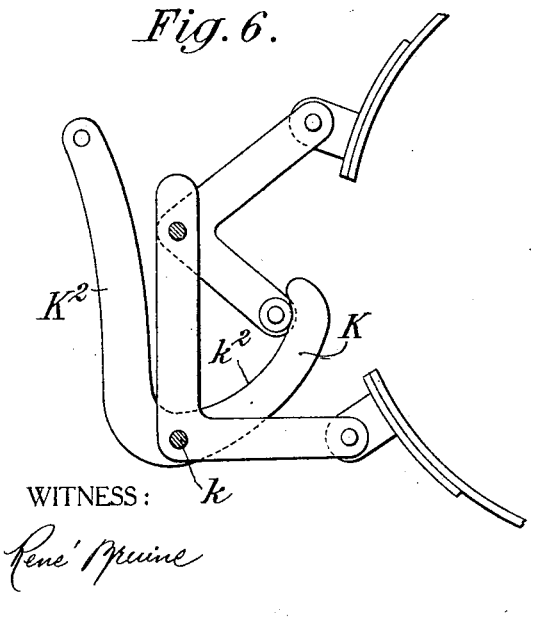
Fig. 6 is a side elevation illustrating a still further change in the arrangement shown in Fig. 5.

The particular form of the operating lever J may be varied in numerous ways for relationship with the brake, such, for instance, as illustrated in Fig. 6, in which the cam portion K is on one side of the pivotal axis k, while the main portion of the lever K² is on the opposite side of the pivot k. The relation of the cam surface k² to the associated lever and brake band is the same as already described with reference to Fig. 5.

It will be apparent that various other changes or modifications may be made, and the invention is intended to cover the mechanical movement as described, irrespective of how it may be worked out in actual practice. The particular lever mechanism is believed to be novel, and the application of such a mechanism to a brake, in order to impart an initial quick movement followed by a slower application of the brake, also constitutes an important feature of my improvement. Any arrangement which accomplishes such a purpose or comes within the terms of the following claims, is deemed within the scope of my invention.

What I claim is:—

1. In a vehicle brake, in combination, a lever to be controlled by the operative, a brake device, and a quick-change, variable-movement mechanism connecting said lever with said device, whereby a uniform movement of said lever through an angular movement of less than 35° may impart to said brake device a quick take-up movement, followed by a slow-brake setting movement, the speed ratio of average take-up movement to that of average brake-setting movement being at least 3 to 1, such variation in speed being substantially completed during the take-up movement and remaining approximately uniform throughout said brake-setting movement.

2. In a vehicle brake, in combination, a pair of levers movable respectively about axes in fixed relation one with respect to the other, and a connecting link pivoted at fixed points to arms of said levers, the relative proportions of said link and lever arms, and the relative positions of their pivotal connections, being such that a uniform angular movement of one of said levers through but a small fraction of a quadrant will impart to the other a relatively rapid take-up movement followed by a relatively slow brake-setting movement, the speed ratio of average take-up movement to that of average brake-setting movement being not less than 3 to 1.

3. In a vehicle brake, in combination, a pair of levers movable respectively about axes in fixed relation one with respect to the other, and a connecting link pivoted at fixed points to arms of said levers, the distance between the axes of said levers being materially less than the sum of the lengths of their link connected arms, and the length of said link being but slightly greater than the difference between said sum and the distance between said axes, said link being cross connected between said arms so that said levers rotate in opposite directions.

4. In a vehicle brake, in combination, a lever to be controlled by the operative, a lever to be connected to the brake device, and a connecting link pivoted at fixed points to arms of each of said levers, the relative proportions of said link and lever arms, and the relative positions of their pivotal connections being such, that a uniform movement of the first mentioned lever through an angle of not more than 30° will impart a relatively rapid take-up movement to the second mentioned lever followed by a relatively slow brake setting movement, the speed ratio of average take-up movement to that of average brake-setting movement being not less than 3 to 1.

5. A power transmission mechanism for vehicle brakes or the like, comprising an actuating lever a lever to be actuated thereby, and a link pivoted at fixed points to arms of said levers, said parts being so proportioned, and their centers of movement being so disposed, that, when in one relation, said actuating lever may drive the actuated lever with a speed ratio of more than 3 to 1, and, after a limited angular movement of less than half a quadrant, said actuating lever may drive said actuated lever with a speed ratio of materially less than unity.

6. A mechanical movement comprising, in combination, two levers movable respectively about axes in fixed relation one with respect to the other, and a connecting link pivoted at fixed points to arms of said levers, the distance between the axes of said levers being materially less than the sum of the lengths of their link connected arms, and the length of said link being not materially greater than the difference between said sum and the distance between said axes, said link being cross connected between said arms so that said levers rotate in opposite directions.

7. A mechanical movement, as defined by claim 6, in which one of the link connected lever arms is approximately three-fourths as long as the distance between said axes.

8. A mechanical movement, as defined by claim 6, in which each of the link connected lever arms is approximately three-fourths as long as the distance between said axes.

9. A mechanical movement comprising, in combination, a driving member mounted for movement about a fixed axis, a driven member mounted for movement about a fixed axis, and a quick-change, variable-speed mechanism for transmitting motion from one of said members to the other, whereby, on rotation of said driving member through an angle not exceeding 30°, the speed ratio of the driven member relative to the driving member may be caused to vary from 2 to 1, or more, to 1 to 2, or less, the parts of said mechanism being so proportioned and related that the speed ratio approaches uniformity as said lever moves in either direction from an intermediate zone of maximum variation.

In witness whereof, I have hereunto signed my name.

EUGENE V. MYERS.